United States Patent [19]

Young

[11] Patent Number: 4,628,221

[45] Date of Patent: Dec. 9, 1986

[54] HOMOPOLAR MOTOR WITH PRESSURIZED LIQUID METAL CONTACT

[76] Inventor: Niels O. Young, 1735 Rush Rd., Eagle, Id. 83616

[21] Appl. No.: 787,322

[22] Filed: Oct. 15, 1985

[51] Int. Cl.$^4$ ............................................. H02K 31/04
[52] U.S. Cl. ...................................... 310/178; 310/90
[58] Field of Search .................... 310/71, 90, 178, 216

[56] References Cited

U.S. PATENT DOCUMENTS

| | | | |
|---|---|---|---|
| 3,084,269 | 4/1963 | Sayers | 310/178 |
| 3,846,653 | 11/1974 | Korotenko et al. | 310/178 |
| 4,168,446 | 9/1979 | Hatch | 310/178 |
| 4,207,486 | 6/1980 | Hatch | 310/178 |
| 4,241,272 | 12/1980 | Marshall | 310./178 |
| 4,241,273 | 12/1980 | Hatch | 310/178 |
| 4,382,199 | 5/1983 | Isaacson | 310/90 |

*Primary Examiner*—Patrick R. Salce
*Assistant Examiner*—D. L. Rebsch
*Attorney, Agent, or Firm*—Leslie G. Murray

[57] ABSTRACT

A homopolar machine having a hollow cylindrical conductor integral with an iron magnetic coupler forms a rotor ring which encircles one end of a rotor. The rotor ring spins within a hermetically sealed volume formed by two current collector rings. The volume is filled with a liquid metal under pressure and void free. The liquid metal provides electrical contact between the cylindrical conductor and the current collector rings and also acts as a lubricant for cylindrical journal bearings at each end of the rotor ring. The rotor is fixedly mounted on a shaft and spins on conventional bearings receiving torque and thrust loads from the rotor ring by magnetic coupling.

4 Claims, 2 Drawing Figures

HOMOPOLAR MOTOR WITH PRESSURIZED LIQUID METAL CONTACT

BACKGROUND OF THE INVENTION

The present invention relates generally to homopolar machines utilizing liquid metal for electrical contact between current collectors and a rotor, and, more particularly, to apparatus for confining liquid metal and maintaining electrical contact between the rotor and stator at all angular velocities, including zero.

In machines such as homopolar motors utilizing high current density field coils, high current-carrying capacity is required for making electrical connections between the rotor and the stator. It is well known in the art to utilize liquid metal current collectors for such machines due to the high current-density capacity of such collectors, for example, 3,000 to 10,000 amperes per square inch, by the liquid metal as compared to approximately one-tenth of this current density in the case of conventional solid carbon brushes. Further, solid brushes exhibit an order of magnitude higher voltage drop than that of liquid metal brushes, even at the lower current density. As a result of this higher voltage drop, solid brushes generate more heat than liquid metal brushes and are prone to fail. To provide the high current carrying capacity required by homopolar motors, a large number of solid brushes are necessary. The current is not necessarily shared equally be all of the brushes resulting in unequal heating and wear of the brushes. Moreover, a failure of one brush allowing debris to be transported around the slip ring may result in catastrophic failure of all the brushes.

In high current, high speed operation of homopolar machines, it has been common practice to provide a constant supply of liquid metal by pumping it to the stator and rotor current collector sites. This ensures that the current collectors are continuously wetted. At high speeds of operation, the centrifugal force tends to drive the liquid metal from between the current collector surfaces. Also, at high current densities, the pinch-effect tends to expel liquid metal from the collector surfaces. An additional problem experienced when utilizing liquid metal current collectors in homopolar machines is that the stray or non-radial components of the magnetic field from the stator can create Lorenz forces across the surface of the rotor collector in the axial direction, tending to eject the liquid metal from the collector site. If these forces cause the liquid metal to escape from the current collector sites, the current collectors would begin to run dry, thereby raising the current density to a point where arc-over and/or welding between the stator and rotor collector areas would occur. Such a result would severely damage the current carrying contact surfaces and would ruin the machine.

Liquid metal circulation means and methods are known in the prior art for circulating liquid metal around current collector sites and providing the necessary confinement of liquid metal in containment cages. In U.S. Pat. No. 4,241,273, Hatch teaches a homopolar machine having a plurality of compliant nonconductive cages affixed to the stator collector ring. Liquid metal is confined in the space defined axially and circumferentially by the cage walls and radially by the radially inner surface of the stator and the radially outermost surface of the rotor collector ring. The liquid metal is in contact with stator fins protruding radially-inwardly into each cage, respectively, and the radially-outermost surface of the rotor collector ring.

Both of the above-described prior art homopolar machines require a continuous supply of liquid metal to the enclosed area to replace liquid metal lost by leakage through the nonconductive walls or drawn out between the enclosure walls and the rotor outer surface by the rotation of the rotors in order to insure continuous contact over the entire current carrying area. One such method is disclosed in U.S. Pat. No. 4,207,486 issued June 10, 1980 to Burton D. Hatch and assigned to General Electric Company. Hatch teaches a disk-type homopolar machine which utilizes the pressure head created by rotation of the rotor disks in frictional contact with a liquid metal in radially-outer current collectors to pump liquid metal radially-inwardly toward radially-inner current collectors. Thus, a constant supply of liquid metal for the current collectors is provided by dynamic pumping through passageways through each stator disk extending from the region adjacent to a radially-outer collector to the region adjacent a radially-inner collector.

It is also known in the prior art to confine the liquid metal in clearly identified contact areas between the rotor and stator current collector rings by use of rigid or compliant nonconductive cages or containment walls disposed between the rotor and stator rings. U.S. Pat. No. 4,241,272 issued on Dec. 23, 1980 to Robert A. Marshall and assigned to General Electric Company discloses confinement of liquid metal by a rigid nonconductive enclosure. U.S. Pat. No. 4,241,273 issued on Dec. 23, 1980 to Burton D. Hatch and assigned to General Electric Company also discloses confinement of a liquid metal in continous contact with a defined surface.

SUMMARY OF THE INVENTION

In accordance with the principles of the present invention a homopolar machine comprises a rotor having a circular cylindrical shell utilized as a conductor ring, a stator current collector ring of one polarity encircling one edge of the rotor conductor ring and another stator current collector ring of the opposite polarity encircling the other edge of the rotor conductor ring. The conducting rotor ring and an integral iron magnetic flux concentrator ring rotate within a hollow cylindrical hermetically sealed enclosure formed by the shapes of the two stator current collector rings and a thin, electrically insulating wall which forms the radially inner wall of the cylindrical enclosure. The cylindrical enclosure is filled with liquid metal, under pressure and void-free. The liquid metal acts as a journal bearing to support the spinning rotor ring as well as providing continuous electrical contact between the stator current collector rings and the rotor ring. The torque produced by the spinning rotor ring is transferred to the rotor and motor shaft by magnetic coupling. Since the liquid metal is hermetically sealed within the cylindrical enclosure, there is no leakage and no requirement to constantly resupply liquid metal to the current collector surfaces. Further, since the liquid metal is void-free and under pressure, problems associated with cavitation are eliminated. The homopolar motor provided according to present invention is considerably simpler in design than those described in the prior art, since no liquid metal pumping and resupply systems are required and the necessity of shaft seals to prevent leakage is eliminated.

BRIEF DESCRIPTION OF THE DRAWINGS

The present invention, both as to design and method of operation, together with further objects and advantages may best be understood by reference to the accompanying drawings in which.

DESCRIPTION OF THE PREFERRED EMBODIMENT

Figure 1:
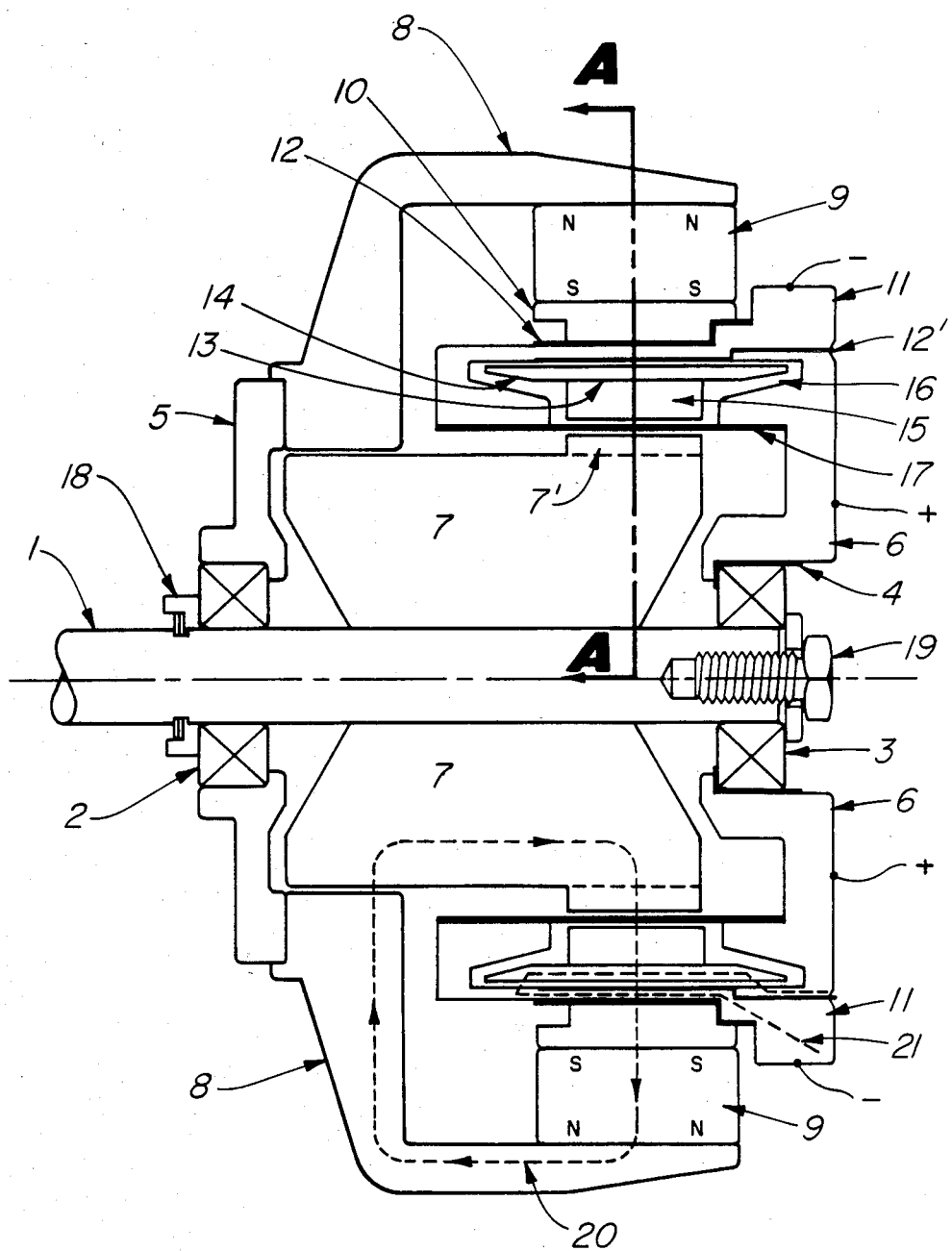
FIG. 1 is a cross-sectional view from the side illustrating a homopolar machine incorporating the principles of the present invention.
Figure 2:
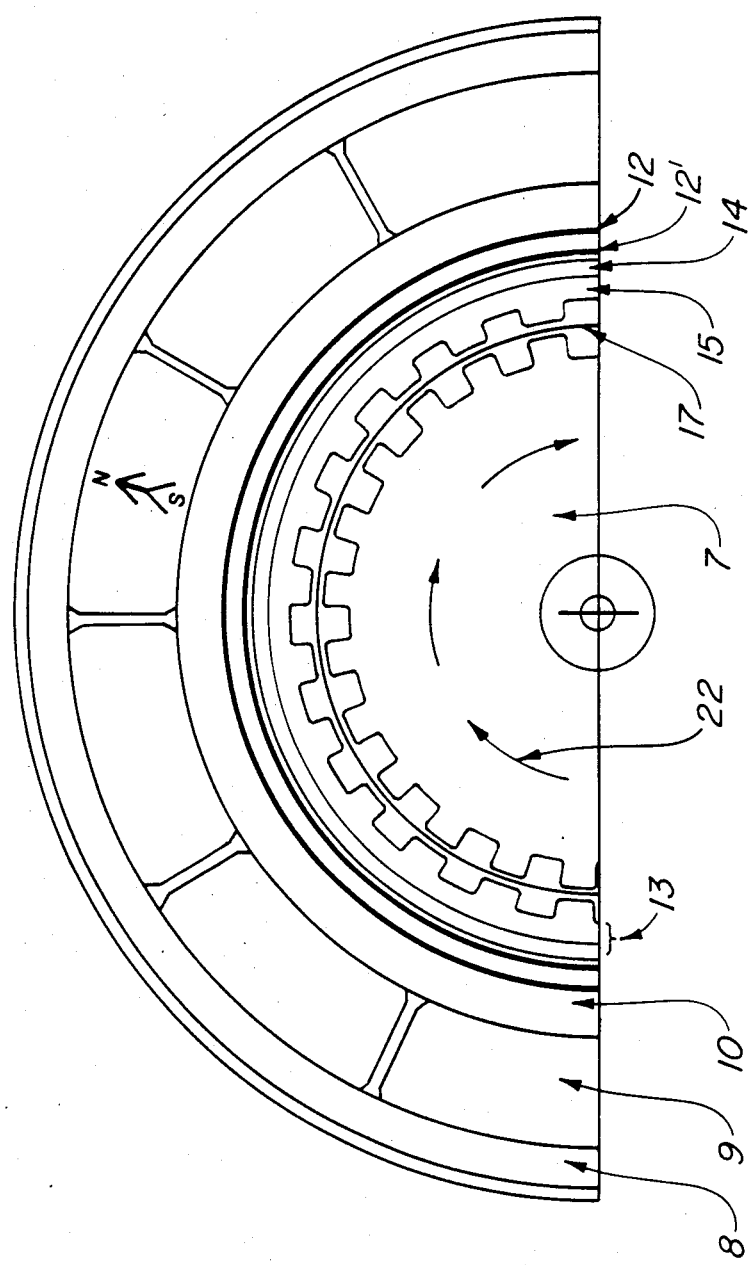
FIG. 2 is a cross-sectional view from one end taken along line A-A' of the homopolar motor illustrated in FIG. 1.

Referring now to FIGS. 1 and 2, a permanent magnet homopolar motor according to the principles of the present invention is shown. A stator assembly comprising a number of permanent magnets 9 is disposed between a cup-shaped frame piece 8 of soft iron and a magnetic flux concentrator ring 10 of soft iron in a ring (as shown in FIG. 2) about a rotor 7. The rotor 7 is mounted within the stator assembly on shaft 1. Surrounding the stator assembly and rotor 7 is the frame piece 8, a mechanical interface plate 5, and frame pieces 6 and 11. The shaft 1 is rotatably mounted in ball bearing assemblies 2 and 3 and retained by retainer ring and washer assembly 18. Bearing screw 19 provides an adjustment means to pre-load the shaft 1. The permanent magnets 9 may be any suitable magnetic material such as neodymium-iron-boron. The rotor may be machined from a single solid piece of suitable magnetic material such as soft iron or vanadium permendur, or may be laminated. The rotor 7 is atached to the shaft 1 by any convenient method such as keying, interference fit or welding.

A rotor ring 13 consists of a cylindrical armature ring 14 and a magnetic coupler ring 15. The rotor ring 13 is disposed within void 16 surrounding and concentric with the rotor 7, opposite a step 7' at one end of the rotor 7. Armature ring 14 is composed of a highly conductive material such as beryllium-cooper; magnetic coupler ring 15 is composed of suitable magnetic material, such as vanadium permendur, and is adjacent to and integrally bonded to the inwardly facing surface of the armature ring 14. The void 16 is formed by frame pieces 6 and 11 and is hermetically sealed by sealing sleeve 17. The void 16 is filled with a highly conductive liquid metal, such as sodium-potassium alloy (Na-K), under pressure. The liquid metal provides electrical contact between the armature ring 14 and the frame pieces 6 and 11 and also serves as the lubricant in a hydrodynamic or journal bearing for the rotor ring 13. The frame pieces 6 and 11 are made of a highly conductive material, such as beryllium-copper, and act as current collectors for the armature current. To reduce reaction with the liquid metal and prevent galling and/or welding as would happen with clean copper surfaces under transient mechanical contact, the surfaces of the frame pieces 6 and 11 forming void 16 and the surfaces of the armature ring 14 are coated with a suitable material which is inert in the Na-K environment, such as chrome plating or plasma sprayed tungsten carbide. Sealing sleeve 17 is a filament-wound composite material coated with a suitable substance, such as a thin layer of ultra high molecular weight polyethylene to provide an inert surface.

In prior art machines, an attempt is made to minimize the clearances between the armature and the current collectors, for example to 0.001" to 0.002", because for larger clearances the liquid metal may not fill the volume completely. Incomplete filling of the clearance between the armature and the current collectors may result in cavitation at high rotor speeds, the likelihood of cavitation increasing in the presence of dissolved or entrapped gases.

The pressure of the liquid metal in void 16 is maintained at a high and steady value without the expenditure of any pumping power because void 16 is hermetically sealed. The fill pressure is great enough to overcome any tendency of the liquid metal to cavitate; i.e., at any location in void 16 where the local pressure is reduced due to inertial or electromagnetic efforts, that local pressure will always exceed the pressure of any dissolved gases or Na-K vapor.

Rotor ring 13 is supported in two radial degrees of freedom by an inner hydrodynamic bearing formed between opposing surfaces of rotor ring 13 and frame piece 11. Rotor ring 13 is supported in two orthogonal radial degrees of freedom by an outer hydrodynamic bearing formed between opposing surfaces of rotor ring 13 and frame piece 6. The inner and outer hydrodynamic bearing thus formed constrains the rotor ring 13 in two linear, orthogonal degrees of freedom and in two torsional degrees of freedom about orthogonal axes. The third linear degree of freedom is constrained by magnetic restoring forces between the magnetic coupler ring 15 and the axially fixed flux concentrator ring 10 and the rotor step 7'. The third torsional degree of freedom is the desired spin axis of the machine and is unconstrained.

Frame pieces 6 and 11 are utilized as the armature current collectors and are composed of a highly conductive material, such as beryllium-copper. In the illustrated embodiment frame piece 6 is the positive connection and frame piece 11 is the negative connection. Insulation shells 4, 12, and 12' insulate the electrical circuit from the motor frame and other electrically conductive components. In operation, a low voltage, high current DC power source (not shown), such as a lithium battery, is connected directly to the motor. By being connected directly to a battery, there are no voltage drops such as those occuring in DC-DC convertors; moreover, such convertors add weight and complexity to the system.

The field magnetic flux path is through the frame piece 8, rotor 7, rotor step 7' magnetic coupler ring 15, armature ring 14, negative current collector 11, concentrator ring 10 and permament magnet 9, as shown by the dashed line 20. The electrical current path is as shown by the dashed line 21. With the magnetic and electrical polarities as shown, the direction of rotation is as shown by arrows 22. The outwardly facing surface of rotor step 7' and the inwardly facing surface of magnetic coupler ring 15 are corrugated as shown in FIG. 2 to provide a magnetic coupling to transfer the torque produced by the spinning rotor ring 13 to the rotor 7. Techniques utilizing such magnetic coupling are well-known in the art and will not be discussed here. The electrical current path, as shown by dashed line 21, provides adjacent, but opposite direction, current paths in the armature ring 14 and the current collector 11, thereby resulting in cancellation of the magnetic field produced by the current flow. Any stray thrust which may originate in the rotor ring 13 is taken up magnetically, the load being transferred to the rotor shaft bearings 2, 3 by magnetic coupling.

While the described invention has been particularly shown and described with reference to the preferred embodiment thereof, it will be understood by those skilled in the art that various changes in form and details may be made therein without departing from the spirit and scope of the present invention. For example, it will be obvious to those skilled in the art that the present invention may also be utilized as a DC generator. Applications include direct coupling to small gas turbines, where the inherently high rpm of the turbine would be an advantage. It will also be appreciated that the hermetically-sealed and maintenance-free current collectors confer advantages when a pair of such homopolar machines are connected together to form a torque convertor.

I claim:

1. A homopolar machine of the type wherein a liquid metal provides electrical connection between two fixed current collector rings and one rotatable current conducting ring, said homopolar machine comprising:
   a rotor,
   a stator assembly including magnetic means to provide a magnetic field and said two fixed current collector rings;
   a frame of magnetic flux conducting material enclosing the rotor and the stator assembly;
   said fixed current collector rings defining a void, said void disposed between the rotor and the magnetic means, said void concentric with the rotor, said void sealed for containing the liquid metal under pressure;
   said rotatable current conducting ring disposed within said void, said liquid metal providing electrical contact between each edge of said rotatable current conducting ring and a different one of said two fixed current collector rings, and said liquid metal hydrodynamically supporting said rotatable current conducting ring in a spaced-apart gap defining relation with the stator assembly for permitting rotation of the rotatable current conducting ring relative to the stator assembly in response to an electrical current flowing in the rotatable current conducting ring; and
   magnetic coupling means for magnetically coupling a torque from said rotatable current conducting ring to said rotor.

2. A homopolar machine as in claim 1 wherein said means to provide a magnetic field comprises a plurality of permanent magnets arranged in a ring disposed between said frame and said rotatable current conducting ring, said plurality of permanent magnets supported by said frame and concentric with the axis of said rotor.

3. A homopolar machine as in claim 2 wherein said rotatable current conducting ring comprises a cylindrical ring of electrical conductive material for carrying an electric current and a ring of magnetic flux conductive material adjacent to and integral with the radially inwardly facing surface of said cylindrical ring, said ring of magnetic flux conductive material for concentrating magnetic flux.

4. A homopolar machine as in claim 3 wherein said magnetic coupling means comprises the radially-inner surface of said ring of magnetic flux conductive material and the opposing radially-outer surface of said rotor, each of said surfaces having slots therein to form matching and opposing teeth thereon for magnetically coupling said torque from the rotatable current conducting ring to the rotor.

* * * * *